United States Patent
Ota et al.

(10) Patent No.: US 6,954,243 B2
(45) Date of Patent: Oct. 11, 2005

(54) LIQUID CRYSTAL DISPLAY DEVICE

(75) Inventors: Yoko Ota, Mobara (JP); Shigeki Nishizawa, Mobara (JP); Norihisa Fukayama, Mobara (JP); Naoto Kobayashi, Mobara (JP)

(73) Assignees: Hitachi, Ltd., Tokyo (JP); Hitachi Device Engineering Co. Ltd., Tokyo (JP)

( * ) Notice: Subject to any disclaimer, the term of this patent is extended or adjusted under 35 U.S.C. 154(b) by 122 days.

(21) Appl. No.: 10/141,141

(22) Filed: May 9, 2002

(65) Prior Publication Data

US 2002/0191131 A1 Dec. 19, 2002

(30) Foreign Application Priority Data

Jun. 19, 2001 (JP) ........................................ 2001-184718

(51) Int. Cl.[7] ............................................. G02F 1/1333
(52) U.S. Cl. ...................... 349/110; 349/153; 349/154; 349/189; 349/190; 349/73
(58) Field of Search ................................ 349/110, 153, 349/154, 189, 190, 73

(56) References Cited

U.S. PATENT DOCUMENTS

| 4,828,364 A | * | 5/1989 | Saito et al. | 349/110 |
| 6,547,616 B1 | | 4/2003 | Furukawa et al. | 445/24 |
| 2002/0051106 A1 | * | 5/2002 | Nagashima et al. | 349/110 |

FOREIGN PATENT DOCUMENTS

| JP | 5-72531 | 9/1991 |
| JP | 11-133404 | 10/1997 |
| JP | 2000-81846 | 4/1999 |

* cited by examiner

*Primary Examiner*—Dung T. Nguyen
*Assistant Examiner*—George Y. Wang
(74) *Attorney, Agent, or Firm*—Reed Smith LLP; Stanley P. Fisher, Esq.; Juan Carlos A. Marquez, Esq.

(57) ABSTRACT

In a liquid crystal display device comprising a pair of substrates between which a liquid crystal layer is interposed, a display surface provided on one of the substrates, and a lighting device arranged at a side of another of the substrates, the present invention forms a light shielding film on at least one of side surfaces of the substrates along a direction perpendicular to the display surface and prevents light leak leaking from the lighting device through the at least one of side surfaces.

13 Claims, 7 Drawing Sheets

LIQUID CRYSTAL DISPLAY DEVICE

BACKGROUND OF THE INVENTION

1. Field of the Invention

The present invention relates generally to liquid crystal display devices used for personal computers, workstations, etc., and more particularly to the effective technique applied to prevention of a light leak from a backlight unit thereof.

2. Description of the Related Art

Liquid crystal display modules of STN (Super Twisted Nematic) type or TFT (Thin Film Transistor) type are widely used as display devices for notebook type personal computers or the like.

Owing to unique features such as thin or slim size, light weight and low power consumption, liquid crystal display devices are becoming more widely used as display devices for display of image and character information in a variety of types of electronic equipment including but not limited to information equipment such as personal computers, portable information terminals, mobile wireless telephone handsets, and visual equipment such as digital cameras and camera-embedded VTR apparatus and others.

These liquid crystal display modules include liquid crystal display panels having driver circuit portions arranged at peripheries thereof and backlight units for irradiating the liquid crystal panels.

For instance, in the TFY type liquid crystal display module, a filter substrate having color filters formed thereon and a TFT substrate having pixel electrodes and thin film transistors (TFTs) formed thereon are superposed on one another with a sealing material formed on peripheries of both of the substrates so as to confront surfaces of both of the substrates having alignment layers formed thereon with one another, and liquid crystals are injected and sealed between the surfaces so that a liquid crystal display panel is finished.

Such techniques are described in e.g. Japanese Patent Publication No. 19474 of 1985 (JP-B2-1985-19474) and Japanese Utility Model Laid-Open No. 22780 of 1992 (JP-U-1992-22780).

SUMMARY OF THE INVENTION

Generally, the liquid crystal display panel is covered by a rectangular frame having a display window defining a display area of the liquid crystal display module, and another area around the display window of the frame is usually called as a picture frame region.

Moreover, a polarizer plate is arranged at the area of the display window of the liquid crystal display panel.

On the other hand, assuming light amount irradiating the liquid crystal display panel by the backlight unit as 100%, the light used for displaying an image thereat (the light also observed by the user thereof) is no more than c.a. 10% of the light amount. The rest 90% of the light amount is attenuated in the liquid crystal display module.

The aforementioned picture frame region serves also as a light shielding board for preventing part of the light emitted by the backlight unit (the aforementioned rest 90% of the light amount) other than used for displaying an image at the liquid crystal display panel from leaking out to the user thereof.

In recent years, it is significant to widen the display area of the notebook type personal computer, etc. without alteration of exterior size thereof.

Consequently, the display area of the liquid crystal display module is also widened keeping exterior size thereof, but the aforementioned picture frame region thereof needs to be narrower (i.e. narrowing of the picture frame region is further required) for widening the display area thereof without alteration of the exterior size thereof.

However, the narrowing of the picture frame region allows part of the light other than that for displaying the image at the liquid crystal display panel (the aforementioned rest 90% of the light amount) to leak out to the user side thereof so that a peripheral portion of the liquid crystal display panel (a boundary portion of the frame) shining bright causes the problem deteriorating display quality in the display screen thereof.

The present invention is to solve the problem mentioned above, and an object thereof is to provide techniques enabling the display quality in the display screen to be improved by preventing leakage of illuminating light which is incident upon a side surface of the liquid crystal display element and leaks out between the upper case and the polarizer plate in the liquid crystal display device.

The aforementioned and other objects and novel features of the present invention will be defined clearly by descriptions in this specification and drawings attached thereto.

The summaries of the representative ones of the present invention disclosed in the present patent application will be explained briefly as follows.

Namely, in a liquid crystal display device comprising a liquid crystal display element (also called as a liquid crystal display panel) which has a pair of substrates (e.g. a first substrate and a second substrate arranged so as to superpose main surfaces of both substrates on one another) and a liquid crystal layer interposed between the pair of substrates and defines a main surface of one of the pair of substrates as a display surface (a surface showing an image to an user thereof), and a luminaire (a side-edge type backlight or a direct type backlight) provided at a main surface of another of the pair of substrates, a first example of the present invention provides a light shielding film on at least one of side surfaces of the pair of substrates along a direction transverse to the display surface of the pair of substrates (i.e. a thickness direction of the liquid crystal display device).

Thickness of the light shielding film is recommended to be so thin as not to increase in the thickness direction of the liquid crystal display device.

The light shielding film is provided on the side surfaces of the substrate, for instance, by coating a material having low optical transmissivity (a light shielding material) on the side surfaces of the pair of substrates in an uniform thickness thereof, or by sticking a tape or a seal of this sort of the light shielding material across the side surfaces of the pair of substrates. One of preferable examples of the light shielding films has almost uniform thickness.

Moreover, in a liquid crystal display device comprising a first substrate, a second substrate, a sealing material provided at peripheries of respective main surfaces of the first and second substrates (a first surface of the first substrate and a first surface of the second substrate being opposite to one another) to form a space in which liquid crystals are sealed, and an injection port provided for the sealing material for injecting the liquid crystals between the main surfaces of the first and second substrates and plugged by a closing material (an end sealing material), a second example of the present invention provides a light shielding film on at least a side surface of the first substrates and a side surface of the second substrate at sides thereof where the closing material is arranged.

The sealing material is formed so as to describe a loop except for the aforementioned injection port in the view on either main surface of the first substrate or the second substrate.

The liquid crystal layer is formed in a space surrounded by the loop of the sealing material between the main surfaces of the first and second substrates.

The closing material is formed often to be protruded outside the loop of the sealing material, and sometimes has higher optical transmissivity than that of the sealing material. Moreover, one of preferred examples of the light shielding film is formed in accordance with the aforementioned first example of the present invention.

Furthermore, similarly to the first example, the second example may be applied to so-called transparent-type liquid crystal display device which uses a first substrate and a second substrate of an insulating material having sufficient optical transmissivity (such an insulating material as glass, plastic, etc.), disposes a luminaire at a side of one of these substrates, and provides a display image on a main surface of another of theses substrates.

Moreover, in a liquid crystal display device comprising: a first substrate having a plurality of pixels each of which has a switching element (e.g. a thin film transistor or a thin film diode) and a pixel; electrode connected to the switching element being arranged in a matrix manner on one of main surfaces (a first surface) thereof; a second substrate having on one of main surfaces (a first surface) thereof which is opposite to the one of the main surfaces of the first substrate; a liquid crystal layer sealed between both of the one of the main surfaces (the respective first surfaces) of the first substrate and the second substrate; a terminal portion provided at respective peripheries of the one of main surfaces of the first substrate along two sides thereof transverse to one another and supplying driving voltages to the switching elements, a third example of the present invention provides a light shielding film on side surfaces of the first and second substrates along at least one of two other sides of the first substrate opposite to the two sides thereof having the terminals formed on the main surface thereof.

The structure according to the third example of the present invention is preferable to a liquid crystal display device in which the terminal portion is not provided at the two other sides (adjacent to one another) of the main surface of the first substrate opposite to the two sides thereof adjacent to one another having the terminals formed thereon, i.e. an active-matrix type liquid crystal display device in which voltage applications and signal supplies to the switching elements are performed at only ones of respective pairs of sides of a main surface of a substrate each pair of which are opposite to one another.

The light shielding may be provided at both of the two other sides of the main surface of the first substrate opposite to the two sides thereof having the terminals formed thereon. The first substrate in this example is also called as a TFT substrate in the liquid crystal display device using thin film transistors for the switching elements. For an example of the thin film transistors, a field effect type transistor having a channel formed of amorphous silicon or polycrystalline silicon is used, and for an example of the thin film diodes, a MIM element stacking a metal or alloy film—an insulating film—a metal or alloy film—an insulating film.

In one of preferred embodiments of the third example of the present invention, a semiconductor chip (also called as the semiconductor integrated circuit, or an IC) is mounted at peripheries along the aforementioned two sides of the first substrate having the terminals formed thereat.

Moreover in the third example of the present invention, a plurality of pixels (pixel electrodes) are arranged in a matrix manner (two-dimensionally) in a display area of the first surface of the first substrate (the main surface opposite to the second substrate), and a light shielding frame member (i.e. an upper case) covering peripheries of the first substrate and the second substrate and having an opening exposing the display area is disposed so as to cover a main surface of the first substrate or the second substrate at an opposite side thereof to the liquid crystal layer from an upper side of the liquid crystal display device (at a side where an user looks at the display region).

Moreover, in a liquid crystal display device comprising: a liquid crystal display panel having a first transparent insulating substrate on one of main surfaces of which a plurality of pixel electrodes are arranged, a second transparent insulating substrate one of main surfaces of which faces the one of main surfaces of the first transparent insulating substrate, and a sealing material provided between the respective ones of main surfaces of both of the first and second transparent insulating substrates to form a space therebetween in which liquid crystals are sealed; and a light-shielding frame-like upper case covering both side surfaces of the first and second transparent insulating substrates and having an opening to expose another of the main surfaces of one of the transparent insulating substrates as a display region, wherein the liquid crystal display panel has a first side and a second side being longer than the first side and transverse to the first side along one of the main surfaces of the transparent insulating substrates, a fourth example of the present invention base on the thus explained third example of the present invention provides light shielding films are provided on side surfaces of the first transparent insulating substrate and the second transparent insulating substrate along the first side and the second side, respectively.

Furthermore, one of preferred examples of the light shielding film is formed in accordance with the aforementioned first example of the present invention. Additionally, the third example and the fourth example may also applied to so-called transparent type liquid crystal display device which uses the first substrate and the second substrate formed of an insulating material having sufficient optical transmissivity (an transparent insulating material as glass, or plastic, or the like) and a luminaire disposed at a side of one of these substrates, and forms a display image on a surface of another of these substrates.

Moreover in the present invention, each of the aforementioned first and second substrates has a polarizer plate on a second surface thereof, the light shielding film is formed continuously between the aforementioned side surface and an area in the second surface of the first substrate or the second substrate where the polarizer plate is not provided.

Furthermore in the present invention, the light shielding film is also formed on at least one of side surfaces of the polarizer plate provided on an opposite surface to the aforementioned display surface along a direction perpendicular to the display surface.

In a preferred embodiment of the present invention, the aforementioned light shielding film is constituted of a black-colored tape adhered to the aforementioned side surfaces by a tackiness agent.

In another preferred embodiment of the present invention, the aforementioned light shielding film is formed of resin of polyester resin to which black pigment is added, and is formed on the side surfaces without an adhesive.

Here, the polyester resin contains a copolymer of ethylene terephthalate and modified alkylene ether terephthalate.

Moreover, the black pigment contains at least one of carbon black and metal black pigment.

Furthermore, the light shielding film has a thickness ranged between 40 μm and 120 μm.

Moreover, the fifth example of the present invention comprises lighting means provided at an opposite side surface to a display surface of the liquid crystal display element (having e.g. the aforementioned structure), wherein the lighting means have a diffusing plate at a surface thereof opposite to the liquid crystal display element, the diffusing plate has a black-colored part at a periphery along at least one side of the diffusing plate, and the black-colored part of the diffusing plate is bent to cover at least one side surface of side surfaces of the first and second substrates along a direction perpendicular to the display surface of the liquid crystal display element.

Since the aforementioned means prevents the leakage of illuminating light which is incident upon the side surface of the liquid crystal display element and leaks out between the upper case and the polarizer plate in the liquid crystal display device, the display quality in the display screen can be improved.

DETAILED DESCRIPTION

Embodiments of the present invention will be explained in detail with reference to the accompanying drawings below.

In the whole drawings for explaining the embodiments, parts performing similar functions are referenced with identical reference characters, with any repetitive explanations eliminated.

<Embodiment 1>
<Basic Structure of a TFF type Liquid Crystal Display Module to which the Present Invention is Applied>

Figure 1:
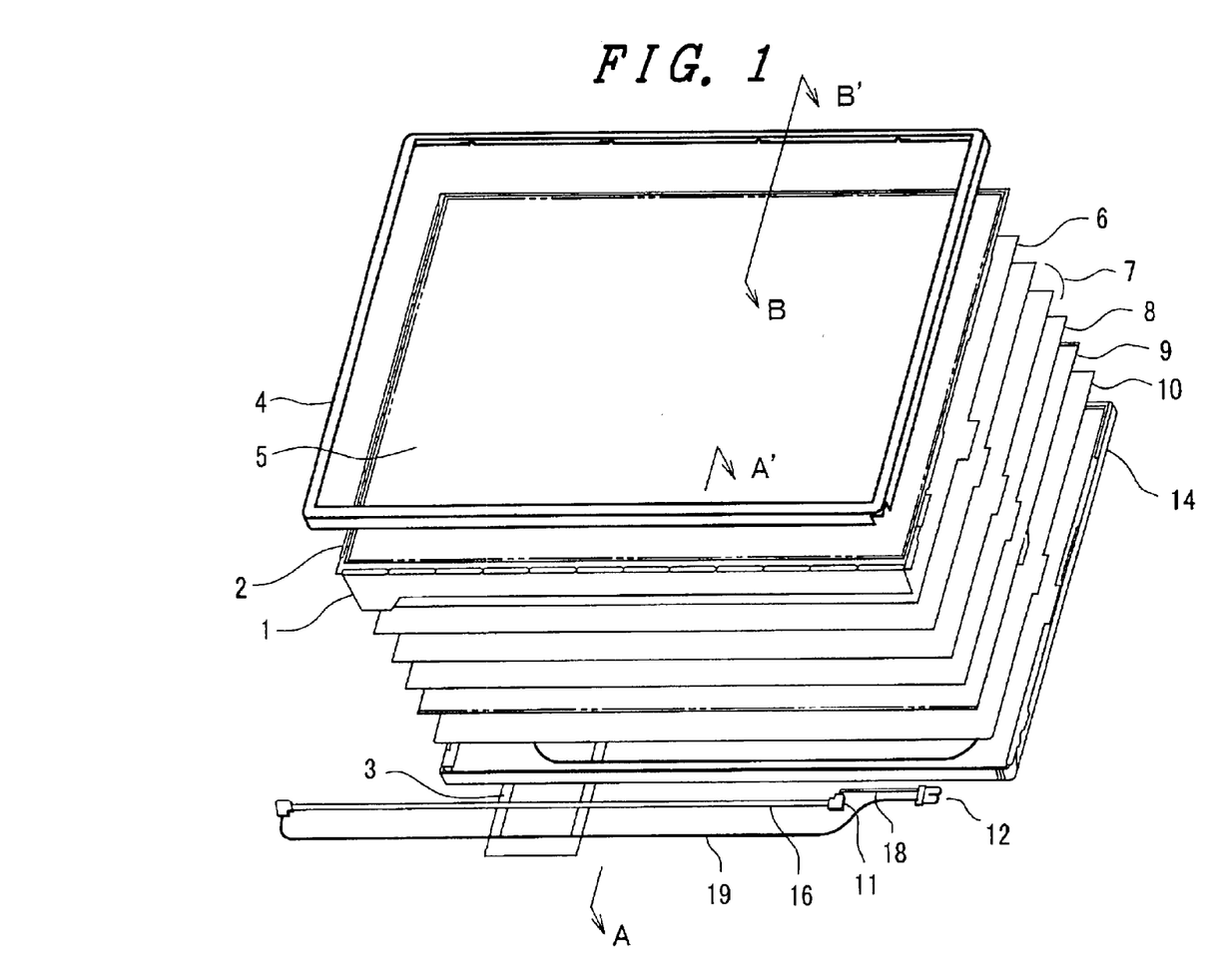
FIG. 1 is an exploded squint view showing an outlined structure of the TFT type liquid crystal display module (LCM) to which the present invention is applied.

FIG. 1 is an exploded squint view showing an outlined structure of the TFT type liquid crystal display module (LCM) to which the present invention is applied.

The liquid crystal display module (LCM) shown in FIG. 1 includes a rectangular-like frame formed of a metal plate (an upper case) 4, a liquid crystal display panel (LCD; the liquid crystal display element according to the present invention) 5, and a backlight unit.

The liquid crystal display panel 5 is constituted by superposing a TFT substrate on which pixel electrodes, thin film transistors, etc. are formed and a filter substrate on which a counter electrode, color filters, etc. are formed to be spaced by a predetermined gap, sticking both of the substrate together with a scaling material provided in a frame-like manner near a peripheral portion between the substrates, injecting liquid crystals inside the sealing materials between both of the substrates through a liquid crystal injection port formed at a part of the sealing material and sealing the liquid crystals therein, and furthermore sticking polarizer plates at outer sides of both of the substrates.

In this situation, a plurality of drain drivers and gate drivers constituted by semiconductor integrated circuit devices (ICs) are mounted on a glass substrate of the TFT substrate.

Driving power source, display data, and control signals are supplied to these drain drivers through a flexible printed circuit board 1, and driving power source and control signals are supplied to these gate drivers through a flexible printed circuit board 2.

These flexible printed circuit board (1, 2) are connected to a driver circuit board 3 provided at a back side of the backlight unit.

Moreover, the liquid crystal display panel 5 on which a plurality of drain drivers and gate drivers are mounted is accommodated between the frame 4 having a display window and the backlight unit.

Accordingly, the display window area of the frame 4 provides a display area of the liquid crystal display module (LCM), and an area other than the display area, i.e. an area around the display window of the frame 4 is usually called as a picture frame.

The backlight unit of the liquid crystal display device in this embodiment is constituted by inserting a cold cathode fluorescent lamp 16, a wedge-shaped light guide body (having a trapezoid-shaped side surface) 9, diffusion sheets (6, 8), a lens sheet 7, and a reflection sheet 10 into a frame-like shaped mold having side walls 14 in an order shown in FIG. 1.

Furthermore in FIG. 1, a reference numeral 11 denotes a rubber bushing, 12 denotes a connector, and 18 and 19 denote cables.

<<Structure of the Pixel Portion of the Liquid Crystal Display Module Shown in FIG. 1>>

Figure 2:
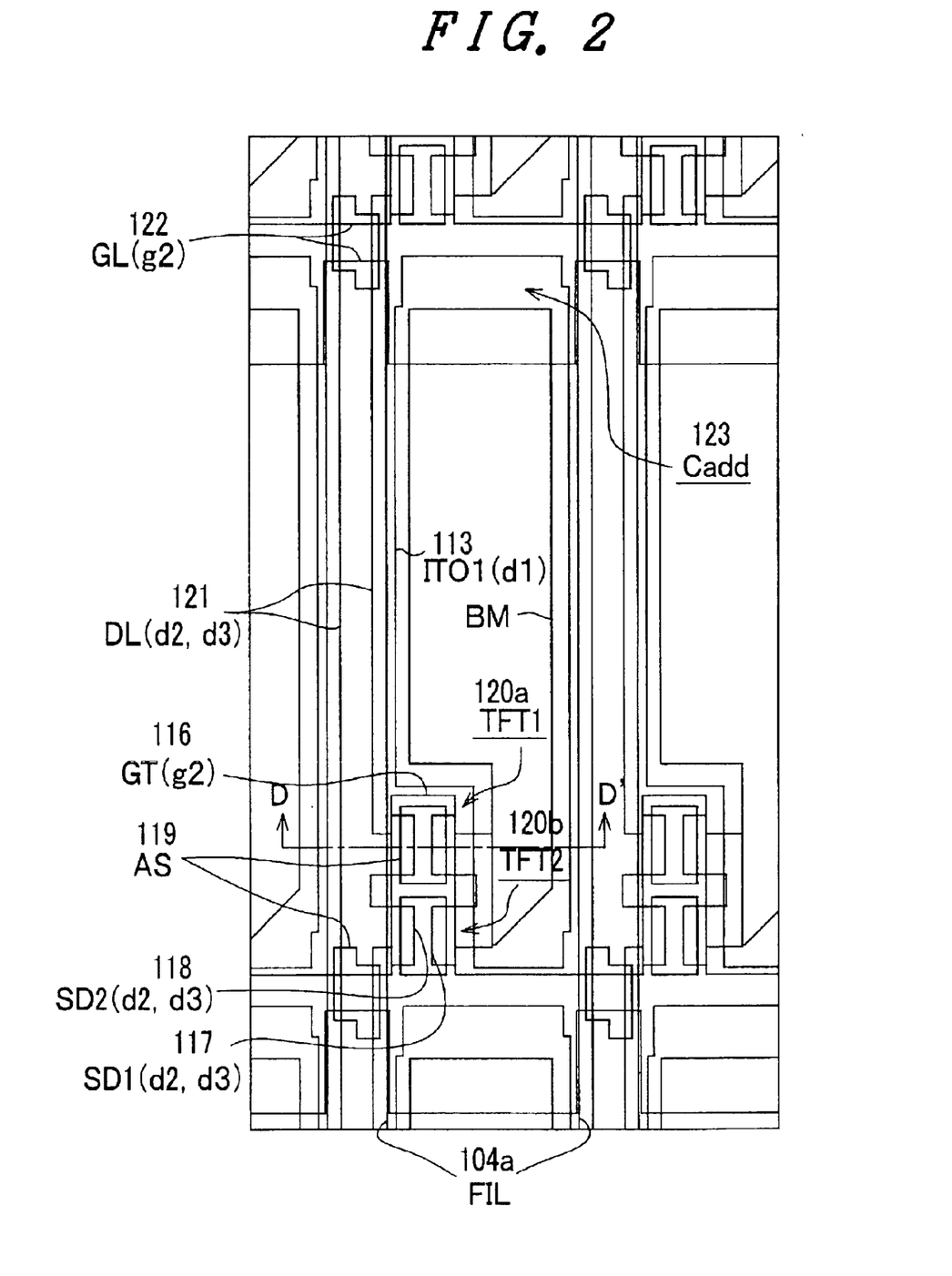
FIG. 2 is a plan view showing one of pixels in the liquid crystal display module shown in FIG. 1 and its periphery.

FIG. 2 is a plan view showing one of pixels in the liquid crystal display module shown in FIG. 1 and its periphery.

Figure 3:
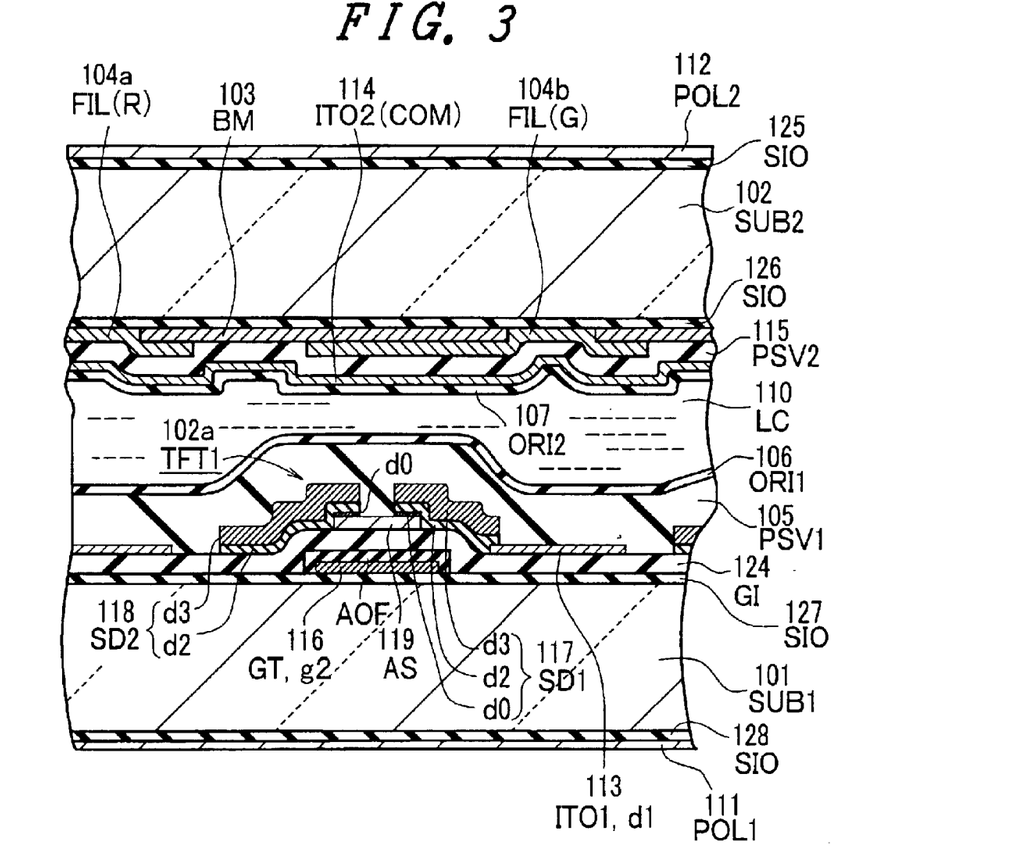
FIG. 3 is a cross section showing a section as taken along a cutting line D—D' of FIG. 2.

FIG. 3 is a cross section showing a section as taken along a cutting line D—D' of FIG. 2.

In FIGS. 2 and 3, reference numerals 101, 102 denote glass substrates (SUB1, SUB2), 103 denotes a black matrix (BM), 104a, 104b, and 104c three color denote color filters of R (Red, FIL(R)), G (Green, FIL(G)), and B (Blue, FIL(B)), respectively, 105 and 115 denote protective films (PSV1, PSV2), 106 and 107 denote alignment films (OR11, OR12), 110 denotes a liquid crystal layer (LC), 111 and 112 denote polarizer plates (POL1, POL2), 113 denotes a pixel electrode (IT01), 114 denotes a common electrode (IT02), 116 denotes a gate electrode (GT), 117 denotes a source electrode (SD1), 118 denotes a drain electrode (SD2), 119 denotes amorphous silicon (AS), 120a and 120b denote thin film transistor (TFT1, TFT2), 121 denotes a data line (DL), 122 denotes a gate line (GL), 123 denotes holding capacitance (Cadd), 124 denotes an insulating film (GI), and 125, 126, 127, and 128 denote silicon oxide films (SIO).

In the liquid crystal display panel shown in FIGS. 2 and 3, each pixel is arranged in a crossing area of adjacent two of scanning signal lines (the gate lines (GL)) and adjacent two of video signal lines (the data lines (DL)) surrounded by 4 signal lines, and includes the two thin film transistors (120a, 120b), the pixel electrode 113, and the holding capacitance 123.

A plurality of the gate lines 122 are extended in a left-to-right direction (a horizontal direction) and juxtaposed in an up-to-down direction (a vertical direction), and a plurality of the data lines are extended in the up-to-down direction (a vertical direction) and juxtaposed in the left-to-right direction.

Each of the thin film transistors (120a, 120b) has the gate electrode 116, the insulating film 124 used for a gate insulating film, the amorphous silicon 119, the source electrode 117, and the drain electrode 118.

The gate electrode 116 is formed continuously to be integrated with the gate line 122 in a shape protruded from the gate line 122 in a perpendicular direction, the gate electrode 116 and the gate line 122 are formed of a single layer of a second conductive film (g2), and moreover, an anodic oxidized film (AOF) is formed on the gate electrode 116 and the gate line 122.

The source electrode 117 and the drain electrode 118 are formed of a second conductive film (d2) contacting with a N+ type semiconductor layer (d0) and a third conductive film (d3) formed thereon, the drain electrode 118 is connected to the data line 121, and the source electrode 117 is connected to the pixel electrode 113.

Moreover, the data line 121 is formed of the second conductive film (d2) and the third conductive film (d3) formed thereon on the same level as that of the drain electrode 118, and the pixel electrode 113 is formed of a transparent first conductive film (d1).

In the liquid crystal display panel shown in FIGS. 2 and 3, the color filters (104a, 104b, 104c) and the black matrix 103, the protective film 115, the common electrode 114 formed of a transparent conductive film, and an alignment film 107 are stacked on an inner side (the liquid crystal layer side) of the glass substrate 102 in this order and constitute the filter substrate.

The gate electrode 116 and the gate line 122, the insulating film 124, the amorphous silicon 119, the pixel electrode 113, the data line 121, the source electrode 117, the drain electrode 118, the protective film 105, and the alignment film 106 are stacked on an inner side (the liquid crystal layer side) of the glass substrate 101 in this order and constitute the TFT substrate.

Moreover, the polarizer plates (111, 112) are respective outsides of the glass substrate (101, 102), and additionally, the silicon oxide films (125–128) are formed on both sides of each of the glass substrates (101, 102) by dipping treatment, etc.

Although not shown in FIG. 3, spacers for keeping thickness of the liquid crystal layer 110 uniform are sealed in the liquid crystal layer.

Figure 4:
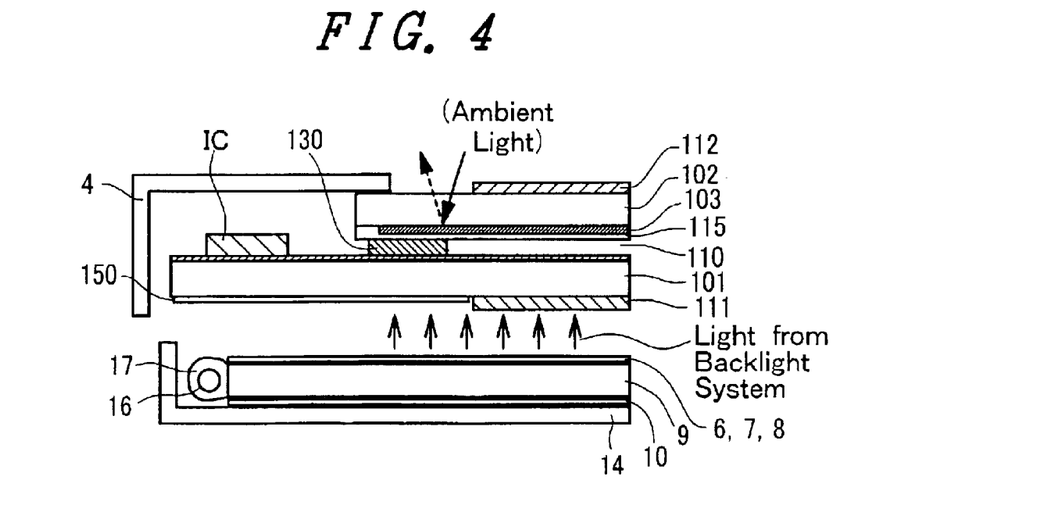
FIG. 4 is a rough cross section showing a sectional structure of a region where a sealing material is formed in the liquid crystal display panel of an embodiment according to the present invention, and is a view showing a sectional structure taken along a cutting line A—A' shown in FIG. 1.

FIG. 4 is a rough cross section showing a sectional structure of a region where a sealing material is formed in the liquid crystal display panel of this embodiment according to the present invention, and is a view showing a sectional structure taken along a cutting line A–A' shown in FIG. 1.

Figure 5:
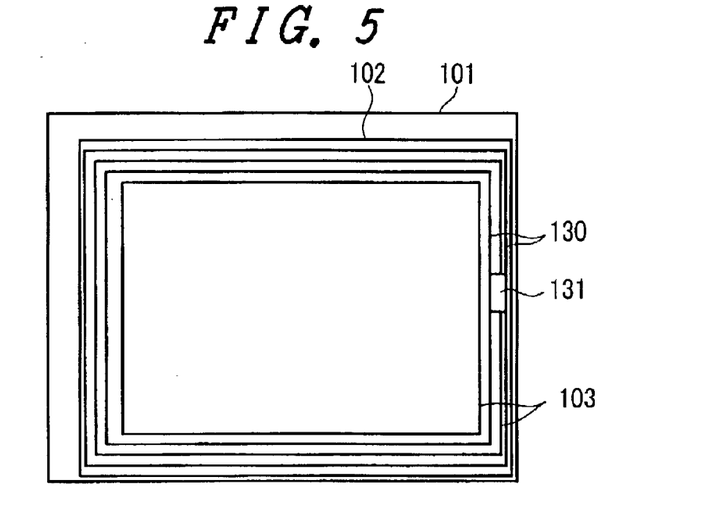
FIG. 5 is a view for explaining an area where the sealing material is formed and a area where a black matrix is formed in the liquid crystal display panel of the embodiment according to the present invention.

In FIG. 4, a reference numeral 17 denotes a lamp reflection sheet, and 130 denotes a sealing material, which is formed into a frame-like shape except for the liquid crystal injection port 131 between respective peripheries of the filter substrate and the TFT substrate as FIG. 5 shows.

More specifically, an area between two lines numbered 130 in FIG. 5 shows the sealing material.

In this embodiment, the black matrix 103 is formed for example of such organic resin as acryl, epoxy, polyimide, etc. into which black pigment like carbon black is added.

The black matrix 103 is formed to extended to an area where the sealing material 130 is formed beyond a pixel area in FIG. 5, and is overlapped partially with the sealing material 130 except for the liquid crystal injection port.

Accordingly, light leak from the backlight leaking out to the display surface through a vicinal region of the sealing material 130 can be obstructed in this embodiment.

A region between two lines denoted by a symbol of 103 in FIG. 5 is the black matrix extended beyond the pixel area to an area where the sealing material 130 is formed, and shows the black matrix formed in a picture frame manner around the pixel area.

Furthermore in this embodiment, since a portion where the black matrix 103 and the sealing material 130 do not overlapped each other is provided almost over a whole circle of the sealing material 130 by eliminating a part of the black matrix 103 of a organic with low adhesive strength to the glass substrate and the sealing material 130, a combination with high adhesive strength of e.g. the glass substrate 102/the protective film 115/the sealing material 130 is obtained and adhesive strength at the sealing region can be improved.

Moreover, the light shielding film 150 is formed on the backlight side surface of the glass substrate 101 in the region where the sealing material 130 and the black matrix 103 do not overlapped each other.

Accordingly, the light leak from the backlight unit leaking through the region where the sealing material 130 and the black matrix 103 do not overlapped each other is obstructed in the sealing region.

<<Feature of the TFT type Liquid Crystal Display Module in the Embodiment According to the Present Invention>>

Figure 6:
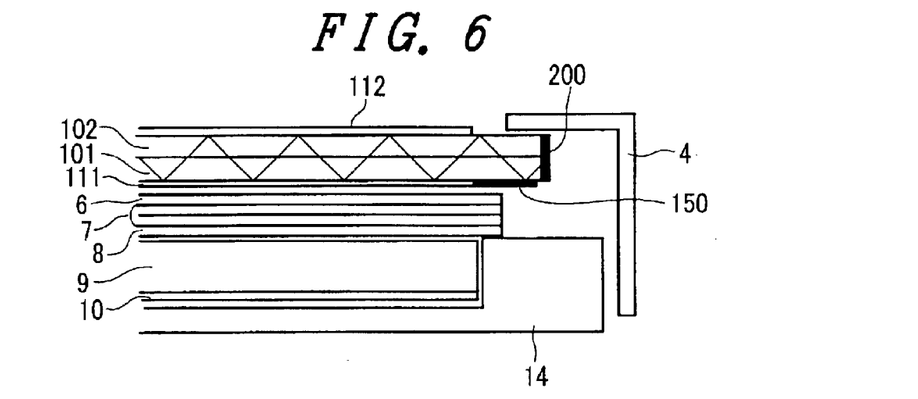
FIG. 6 is a rough cross section showing a sectional structure of the liquid crystal display module of the embodiment 1 according to the present invention.

FIG. 6 is a rough cross section showing a sectional structure of the liquid crystal display module of the embodiment 1 according to the present invention, and is a view showing a sectional structure taken along a cutting line B—B' shown in FIG. 1

As FIG. 6 shows, a side surface light shielding film (a lateral light shielding film, hereinafter) 200 is formed on side surfaces of glass substrates (101, 102) constituting a liquid crystal display panel 5 and a side surface of a sealing material 130 (a side surface along a direction perpendicular to the display surface of the liquid crystal display panel 5) in this embodiment.

In FIG. 6, the sealing material 130 is omitted to be shown.

Functions of the lateral light shielding film 200 will be explained hereinafter.

Figure 7:
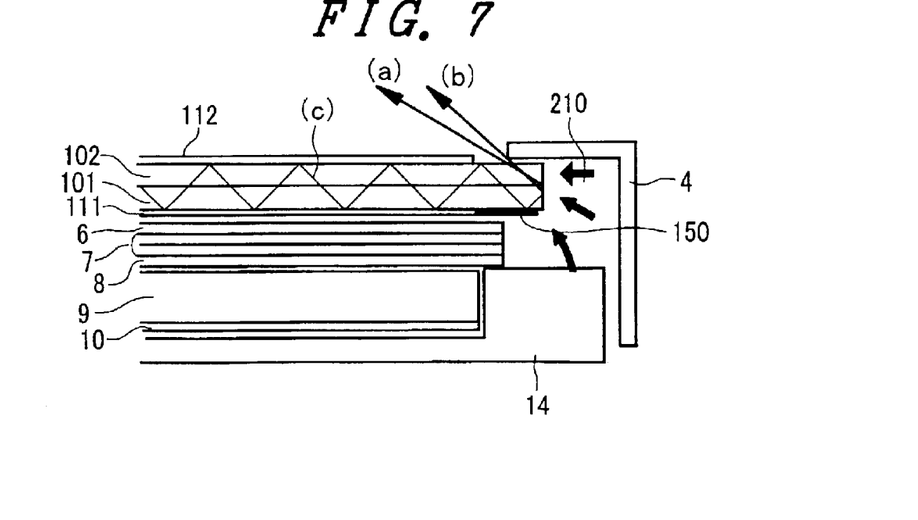
FIG. 7 is a view showing a sectional structure of the same part as shown in FIG. 6 in the case for the sectional structure without a side surface light shielding film formed thereat.

FIG. 7 is a view showing a sectional structure of the same part as shown in FIG. 6 in the case for the sectional structure without the lateral light shielding film 200 formed thereat As mentioned before, assuming light radiated from the backlight unit as 100%, the light for displaying an image in the liquid crystal display panel (the light being actually observed by the user) is no more than c.a. 10%. The rest 90% of the light is attenuated inside the liquid crystal display module.

Therefore, as FIG. 7 shows, the aforementioned 90% of the light passes partially through the mold 14 and leaks out into a space between the frame 4 and the mold 14 (a space 210 in FIG. 7) so that the part of the light enters the glass substrates (101, 102) and the sealing material 130 constituting the liquid crystal display panel 5 through side surfaces thereof.

Figure 8:
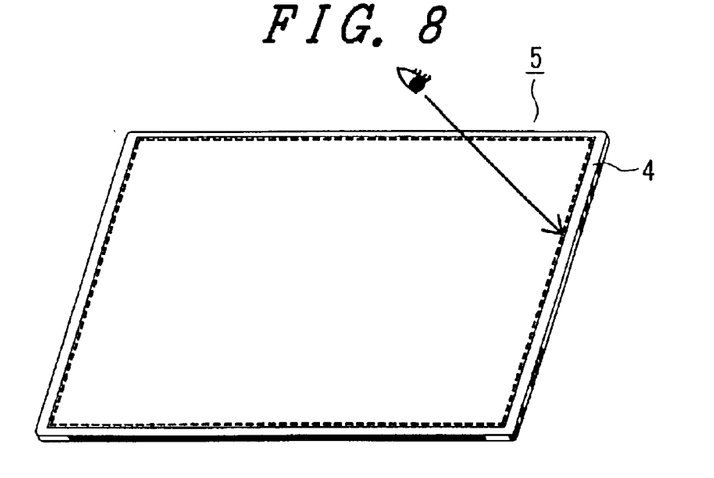
FIG. 8 is a view for explaining light leaking between a polarizer plate and a frame in a conventional liquid crystal display panel to a display surface side (an user side) of the liquid crystal display panel.

Then, part thereof leaks out between the polarizer plate 112 and the frame 4 to the display surface side (the user side) of the liquid crystal display panel 5 as (a) in FIG. 7 shows, and a peripheral portion of the liquid crystal display panel 5 adjacent to the frame 4 shines bright as FIG. 8 shows.

Moreover, when light of the backlight enters the liquid crystal display panel 5 through a back thereof, the light partially progresses in the liquid crystal display panel (as light denoted by (c) in FIG. 7) and is reflected by the side surface of the liquid crystal display panel 5 (concretely, side surfaces of the glass substrates (101, 102)).

The reflected light also leaks partially between the polarizer plate 112 and the frame 4 out to the display surface side (the user side) of the liquid crystal display panel 5 as (b) in FIG. 7 shows and makes the peripheral portion of the liquid crystal display panel 5 adjacent to the frame 4 shine bright.

Accordingly, there is a problem deteriorating display quality of the display screen of the liquid crystal display panel 5 significantly in the conventional liquid crystal display module.

However in this embodiment, the lateral light shielding film 200 is formed on the side surfaces of the glass substrates (101, 102) and the sealing material 130 constituting the liquid crystal display panel 5 as described before.

Therefore, part of the light passing through the mold 14 and leaking out to the space between the frame 4 and the mold 14 (the space 210 in FIG. 7) can be prevented from entering the glass substrates (101, 102) and the sealing material 130 through the side surfaces thereof.

Similarly, the light progressing in the liquid crystal display panel can be prevented from being reflected at the side surface of the liquid crystal display panel 5.

The aforementioned problem becomes more significant by reducing the picture frame. This point will be explained hereinafter.

Figure 9:
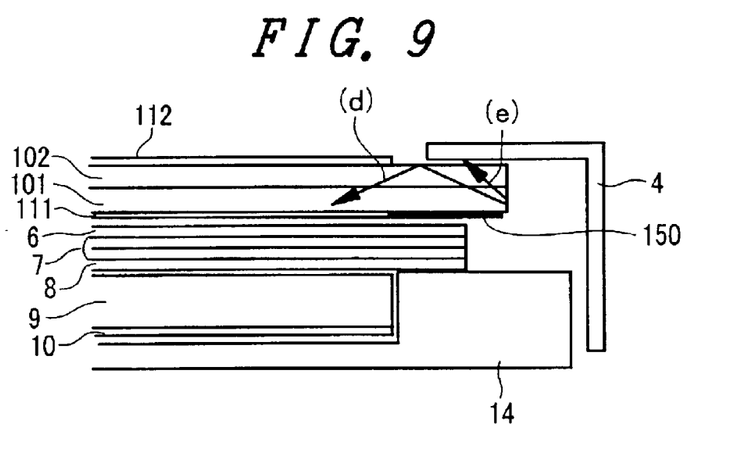
FIG. 9 is a view showing a sectional structure of the same part as shown in FIG. 7 in the case for the sectional structure where a part of the liquid crystal display panel covered by the frame is large.

FIG. 9 is a view showing a sectional structure of the same part as shown in FIG. 7 in the case for the sectional structure where a part of the liquid crystal display panel covered by the frame is large.

In the case shown in FIG. 9, even though light leaking out to the space between the frame 4 and the mold 14 through the mold 14 partially enters the glass substrates (101, 102) and the sealing material 130 through the side surfaces thereof, the light toward a space between the polarizer plate 112 and the frame 4 from the side surfaces of the glass substrates (101, 102) and the sealing material 130 is totally reflected at an interface between the glass substrate 102 and air as (d) in FIG. 9 shows so that the light does not leak out to the display surface side (the user side) of the liquid crystal display panel 5.

As (e) in FIG. 9 shows also, the light incident on the side surfaces of the glass substrates (101, 102) and the sealing material 130 which leaks toward the display surface side (the user side) of the liquid crystal display panel 5 is obstructed by the frame 4.

Therefore, this embodiment has much effect on the peripheral region of the liquid crystal display panel 5 especially when the area thereof covered by the frame 4 is especially not broader than 1.5 mm.

Meanwhile, the black matrix 103 is formed at the liquid crystal layer 110 side of the glass substrate 102 to be extended to an area of the sealing material 130.

Thus, the aforementioned light leak does not much matter in the area where the sealing material 130 is formed, but is significant in a area where the liquid crystal injection port 131 is formed because of the absence of the black matrix 103.

Therefore, while the lateral light shielding film 200 may be formed on the whole of the side surfaces of the glass substrates (101, 102) and the sealing material 130, it is preferable to form the lateral light shielding film 200 on side surfaces at two sides of the side surfaces of the glass substrates (101, 102) and the sealing material 130 including a surface at the liquid crystal injection port 131 side other than a side surface continuing from the side of the glass substrate 101 where a semiconductor integrated circuit device (IC) is mounted.

Namely, the semiconductor integrated circuit device (IC) is mounted at the liquid crystal layer 110 side of the glass substrate 101, and furthermore a terminal portion is formed in a periphery of a side of the glass substrate 101 where the semiconductor integrated circuit device (IC) is mounted.

Therefore, in the side surfaces of the glass substrates (101, 102) and the sealing material 130, a process for forming the lateral light shielding film 200 on a side surface thereof continuing from the side of the glass substrate 101 where a semiconductor integrated circuit device (IC) is mounted becomes a main factor complicating manufacturing steps of the liquid crystal display module.

Moreover as it will be mentioned later, since the lateral light shielding film contains for example conductive carbon or the like, potential for causing short circuits of the semiconductor integrated circuit (IC) is great.

The lateral light shielding film 200 is formed for example of a black-colored light shielding tape to be adhered with an adhesive, or polyester resin (e.g. copolymers of ethylene terephthalate and modified alkylene ether terephthalate) to which black pigment is added.

When the lateral light shielding film 200 is formed of the latter, the polyester resin (e.g. copolymers of ethylene terephthalate and modified alkylene ether terephthalate) to which black pigment is added, the film material is not crumbled to be powdered and becomes continuous like tape so that the lateral light shielding film 200 is characterized to be peeled continuously for exfoliation thereof.

In this case, differently from another case for the aforementioned black colored light shielding tape, the lateral light shielding film 200 is formed on the side surface of the glass substrate 101 as the TFT substrate without adhesives.

Furthermore in this case, the thickness (the film thickness) after coating and drying will be ranged between 40 $\mu$m and 120 $\mu$m (more preferably between 50 $\mu$m and 100 $\mu$m) and thus can be formed thinner than the polarizer plate 111.

The technique for forming a light shielding resin film on side surfaces of the liquid crystal display panel is also described in Japanese Patent Laid-Open No. 133404 of 1998 (JP-A-1998-133404, called a document (A) hereinafter).

The document (A) discloses a technique covering an outer edge surface of (a side surface) of a substrate with a light shielding member (e.g. resin having light shielding property) in a liquid crystal display device where a liquid crystal display element having a liquid crystal layer interposed between a pair of substrates is adhered and held by a holder or the like.

However, an object of the technique described in the document (A) is to prevent carriers generated at a display surface side of the liquid crystal display element (because the liquid crystal display device is a projection type, the display surface is irradiated with light from the luminaire) from causing erroneous operation of driving circuits of the liquid crystal display element provided at a periphery of a substrate (a silicon substrate), and thus the document (A) never suggests any potential of the light leak problem of the backlight irradiating an opposite side of the liquid crystal display element to the display surface thereof that the present inventors are conscious of. In other word, the document (A) teaches that the technical problem caused by light incident on a periphery of the display surface of the liquid crystal display panel 5 can be solved as long as the periphery is covered by the frame 4.

Furthermore, the light shielding member described in the document (A) is not a light shielding film having uniform film thickness (i.e., a thin-film like light shielding film), and furthermore the document (A) fails to refer materials constituting the aforementioned outer light shielding film in detail.

Especially, any description for making the light shielding film of the polyester resin to which black pigment is added cannot be found in the document (A).

Physical property of the lateral light shielding film 200 determines whether the lateral light shielding film 200 shows such properties as sticking to the side surface of the glass substrate 101 with proper strength and keeping a tape-like shape without deterioration to be powdered as mentioned before, or not.

Namely, both viscosity enabling the lateral light shielding film 200 to adhere to the glass substrate 101 and elasticity enabling the lateral light shielding film 200 to keep its shape as coated on the glass substrate against external force (especially force exfoliating the lateral light shielding film 200 from the glass substrate) are required for materials for the lateral light shielding film 200.

Assuming the aforementioned lateral light shielding film 200 as a viscoelastic material, the lateral light shielding film 200 is required to show a rubber-like property in a range of ambient temperature (e.g. −40~+60° C.) under which the liquid crystal display device is used.

The viscoelastic material is in a glass stage for temperature not higher than glass transition temperature (Tg), in a rubber stage (a stage for molecular chain thereof frozen in the glass stage to start its movement) for temperature not lower than the glass transition temperature, and in a fluid stage (a stage for substantial extinction of elasticity thereof) for temperature further higher than the glass transition temperature as described for example in pages 14–20 (section 2.2.1 "NENDANSEITAI TOSHITENO NEN-CHAKUZAI (Tackiness Agents as Viscoelastic Material)") in the "NENCHAKU-GIJUTSU (Adhesion Technologies)" by Keishi Fukuzawa (published by "KOUBUNSHI KANK-OUKAI KABUSHIKI-GAISHA (Macromolecule Publishers, Inc.)", 1987 as the seventh edition).

Assuming the lateral light shielding film 200 as the viscoelastic material in the rubber stage, its elasticity due to degree of freedom for its molecular-chain movement can vie with the external force while sticking to the glass substrate 101 with its proper viscosity, so that its shape can be kept as it is coated against desiccation and exfoliation.

When resin material (tacking agent) showing property in the aforementioned rubber stage at least in an atmospheric temperature range (e.g. 0~+30° C.) for assembling the liquid crystal display device according to the present invention is used for the aforementioned lateral light shielding film 200 thereof, the advantage can be also reproduced without limitation of the lateral light shielding film material to the polyester resin used in this embodiment.

According to the aforementioned publication, tacking agent (adhesives) usually includes elastomer (rubber-like elastic solid), tackifier resin, and softening agents (and often a trace amount of anti-aging agent).

The resin material (tacking agent) constituting the lateral light shielding film 200 for the liquid crystal display device according to the present invention contains i.e. solvent material as e.g. methyl ethyl ketone, acetone, toluene, xylene, or the like, which behaves like the tackifier resin or the softening agents mentioned before in the resin material.

Namely, even after coating and curing ingredients of the lateral light shielding film 200 on the glass substrate, effects of proper adhesiveness of the lateral light shielding film 200 to a main surface of the glass substrate and of preservation of its shape as coated (in tape-like) are securely obtained in the liquid crystal display device according to the present invention.

For instance in the aforementioned embodiment, when a detection peak height of the softening agent contained in the lateral light shielding film 200 adhered to the glass substrate 101 extends equal to or beyond a half of that of the resin material as the ethylene terephthalate or the modified alkylene ether terephthalate contained also therein for composition analysis of thereof by gas chromatography, the lateral light shielding film 200 provides not only the aforementioned advantage but also another advantage enabling itself to be exfoliated entirely (the lateral light shielding film 200 is almost not left on the glass substrate after its exfoliation).

This advantage improves yield factor for finishing the liquid crystal display device significantly by making such repair of the liquid crystal display panel for exfoliating the lateral light shielding film 200 formed distortedly on the glass substrate 101 therefrom once and then coating a lateral light shielding film 200 thereon again possible.

Moreover, this additional advantage can be achieved not only by the material exemplified in this embodiment but also by determining a physical property of the resin material constituting the lateral light shielding film 200 as mentioned before, and is considered to be free from any limitation to specific composition.

Moreover, the resin formed into the lateral light shielding film 200 includes polyester resin, black-colored pigment, dispersing agent, and solvent.

Here, the polyester resin contains a copolymer of ethylene terephthalate or the modified alkylene ether terephthalate, and the black-colored pigment is formed of carbon black.

Moreover, the dispersing agent includes an organic dispersing agent (e.g. butyl n-acetate, propylene glycol monomethyl ether acetate, isobutyl alcohol, etc.), and methoxy-butyl acetate is selected for the solvent.

In this embodiment, content of the solvent is settled in a range of 30–60 weight % (more preferably at 45 weight %).

While the aforementioned embodiment is explained in the case for using carbon black for the black-colored pigment to be added into the polyester resin, black-colored pigment of metal series as cobalt oxide particles, chromium oxide particles, titanium oxide particles, titanium-nitric oxide particles, etc. other than the carbon black can be also used.

By use of the lateral light shielding film (the side surface light shielding film) 200, the following effects can be obtained.

(1) Since the lateral light shielding film 200 is neither crumbled to be powdered nor peeled off partially, any foreign substances can be prevented from entering the liquid crystal display module.

(2) Since the lateral light shielding film 200 is in a state being tape-like continuous after coated and cured, the lateral light shielding film 200 can be peeled continuously for exfoliation thereof.

<Embodiment 2>

<<Feature of a TFT type Liquid Crystal Display Module of this Embodiment According to the Present Invention>>

Figure 10:
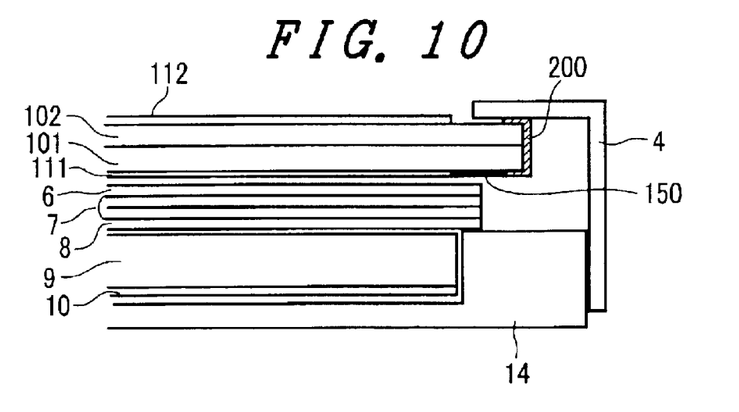
FIG. 10 is a rough cross section showing a sectional structure of the liquid crystal display module of an embodiment 2 according to the present invention.

FIG. 10 is a rough cross section showing a sectional structure of the liquid crystal display module of an embodiment 2 according to the present invention, and is a view showing a sectional structure taken along a cutting line B—B' shown in FIG. 1.

In FIG. 10, showing the sealing material 130 is omitted.

As FIG. 10 shows, this embodiment differs from the aforementioned embodiment 1 in a point where the lateral light shielding film 200 is formed also to be extended to surfaces of the glass substrates (101, 102) constituting the liquid crystal display panel 5 on which polarizer plates (111, 112) are provided in addition to the side surfaces of the glass substrates (101, 102) and the sealing material 130.

Also in this embodiment, the lateral light shielding film 200 is formed for example of a black-colored light shielding tape to be adhered with an adhesive, or polyester resin (e.g. copolymers of ethylene terephthalate and modified alkylene ether terephthalate) to which black pigment is added.

Furthermore, it is preferable to form the lateral light shielding film 200 on side surfaces at two sides of the whole side surfaces of the glass substrates (101, 102) and the sealing material 130, including a surface at the liquid crystal injection port 131 side, other than a side surface continuing from the side of the glass substrate 101 where a semiconductor integrated circuit device (IC) is mounted, and also at peripheries of the surfaces of the glass substrates (101, 102) which continue from the side surfaces and the polarizing plates (111, 112) are formed on.

The aforementioned light leak can be also prevented in this embodiment.

Figure 11:
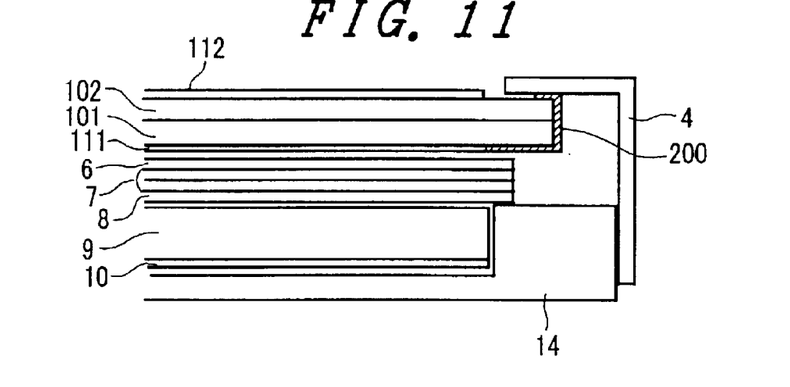
FIG. 11 is a rough cross section showing a sectional structure of a variant example of the liquid crystal display module of the embodiment 2 according to the present invention.

Furthermore in this embodiment, the lateral light shielding film 200 may be extended longer so as to serve also as a light shielding film 150 on a surface at the side of the glass substrate 101 having the polarizer plate 111 formed thereat as shown in FIG. 11.

Figure 12:
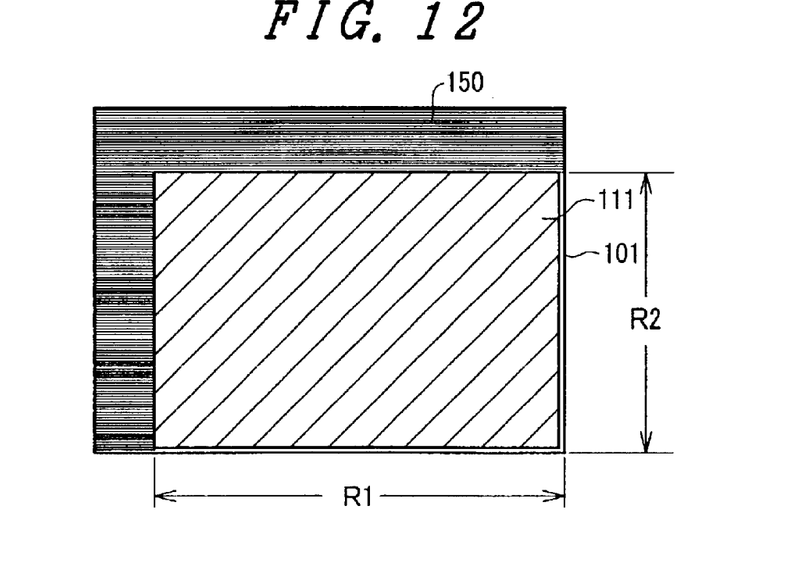
FIG. 12 is a view for explaining an area where the light shielding film is formed in the liquid crystal display module of the embodiment 2 according to the present invention.

In this case, the light shielding film 150 can be formed only in a region of the glass substrate 101 where the semiconductor integrated circuit devices (ICs) are mounted faces at a surface side of the glass substrate (101, 102) having the polarizer plate (111, 112) formed thereat, as shown in FIG. 12.

FIG. 12 is a view for explaining an area where the light shielding film 150 is formed in the liquid crystal display module of the embodiment 2 according to the present invention.

FIG. 12 is a view of the liquid crystal display device from the backlight side.

In the example shown in FIG. 12, the light shielding film 150 is provided at one sides of longer sides and one sides of shorter sides of the glass substrate 101 as the TFT substrate, and the semiconductor chips (ICs) constituting the drain drivers and the gate drivers are mounted on an opposite side of the glass substrate 101 to the region on which this light shielding film is formed (the display surface side thereof) as shown in FIG. 4.

Here, the semiconductor chips (ICs) mounted at the one of the longer sides constitute the drain drivers, and the other semiconductor chips (ICs) mounted at the one of the shorter sides constitute the gate drivers.

While the polarizer plate 111 is formed on the surface of the glass substrate 101 as the TFT substrate at the backlight side, the light shielding film 150 in the example shown in FIG. 11 is formed in a region other than that where the polarizer plate 111 is formed.

Moreover, the lateral light shielding film 200 is formed along the portions (R1, R2) shown in FIG. 12. In this case, as the lateral light shielding film 200 may be formed thinner than the polarizer plates (111, 112), unevenness in the thickness of the liquid crystal display panel 5 can be reduced.

Additionally, FIG. 12 shows the light shielding film 150 in the case for being provided in a whole region of the surface of the glass substrate 101 as the TFT substrate at the backlight side, and the polarizer plate 111 is not formed on the region.

Therefore, the light shielding film 150 in this embodiment is provided so as to include the region not covered by the rectangular frame 4 as shown in FIG. 4.

Figure 13:
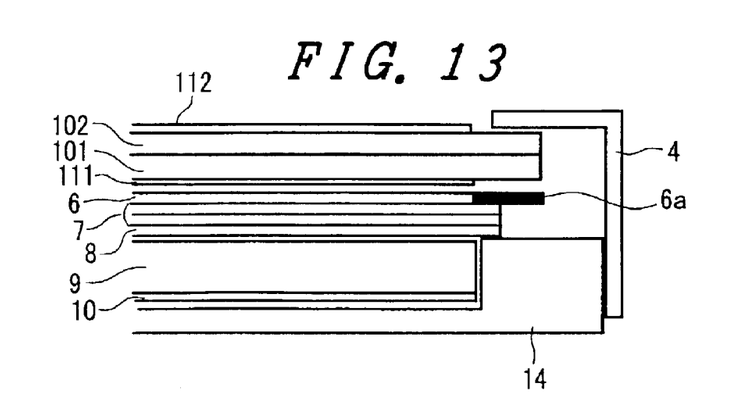
FIG. 13 is a view for explaining one of examples of upper diffusing plates in the conventional liquid crystal display device.

Hitherto, obstruction of the light from the backlight in the area where the light shielding film 150 is formed as shown in FIG. 12 is performed by forming the upper diffusion plate 6 wider and printing a periphery 6a thereof black as FIG. 13 shows.

However in the liquid crystal display device shown in FIG. 11, the aforementioned black printing needs not to be applied to the upper diffusion plate 6, and furthermore the area of the upper diffusion plate 6 may be reduced so that the production cost of the liquid crystal display device shown in FIG. 11 can be reduced.

<Embodiment 3>

<<Feature of a TFT type Liquid Crystal Display Module of this Embodiment According to the Present Invention>>

Figure 14:
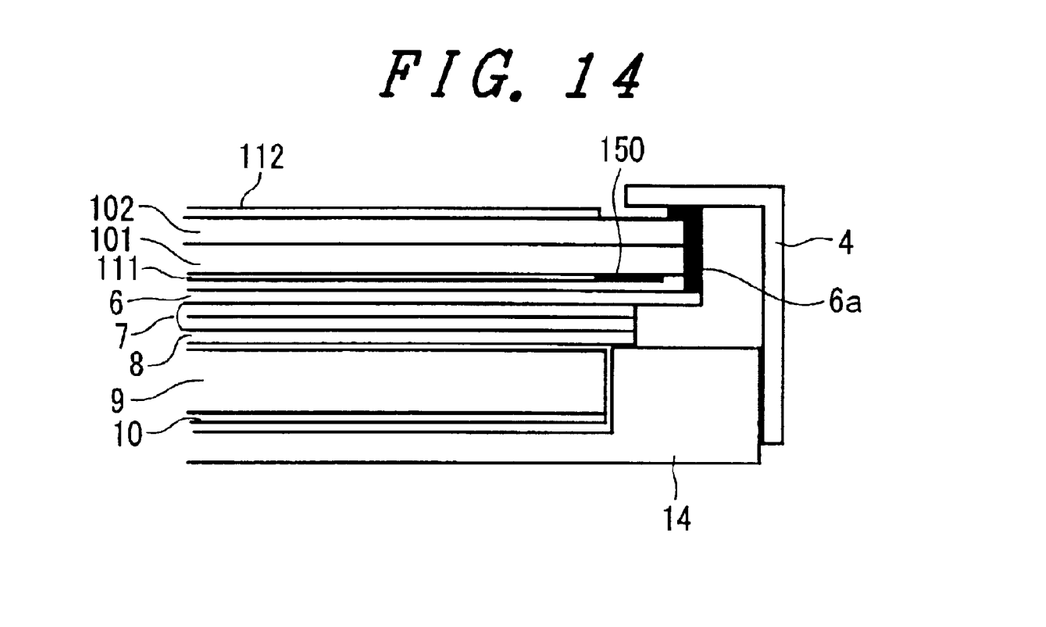
FIG. 14 is a rough cross section showing a sectional structure of a variant example of the liquid crystal display module of an embodiment 3 according to the present invention.

FIG. 14 is a rough cross section showing a sectional structure of an edge portion of the liquid crystal display module of an embodiment 3 according to the present invention, and is a view showing a sectional structure taken along a cutting line B—B' shown in FIG. 1.

In FIG. 14, showing the sealing material 130 is omitted.

As FIG. 14 shows, an upper diffusion plate 6 in this embodiment is extended to serve also as the lateral light shielding plate 200.

In this embodiment, a peripheral portion 6a of the upper diffusion plate 6 is printed with black color and is bent so as to cover side surfaces of the glass substrates (101, 102) and the sealing material 130 constituting the liquid crystal display panel 5.

Although the peripheral portion 6a is illustrated to cover a periphery on a surface of the glass substrate 102 at the polarizer plate 112 side in FIG. 14, the peripheral portion 6a may be also formed to cover the side surface of the liquid crystal display panel 5 only as FIG. 6 shows.

Accordingly, the aforementioned light leak can be prevented also in this embodiment.

Moreover in this embodiment, it is preferable to form the peripheral portion 6a to cover two side surfaces of the whole side surfaces of the glass substrates (101, 102) and the sealing material 130 which include a surface at the liquid crystal display injection port 131, and other than a side surface thereof continuing from the side of the glass substrate 101 where a semiconductor integrated circuit device (IC) is mounted.

Figure 15:
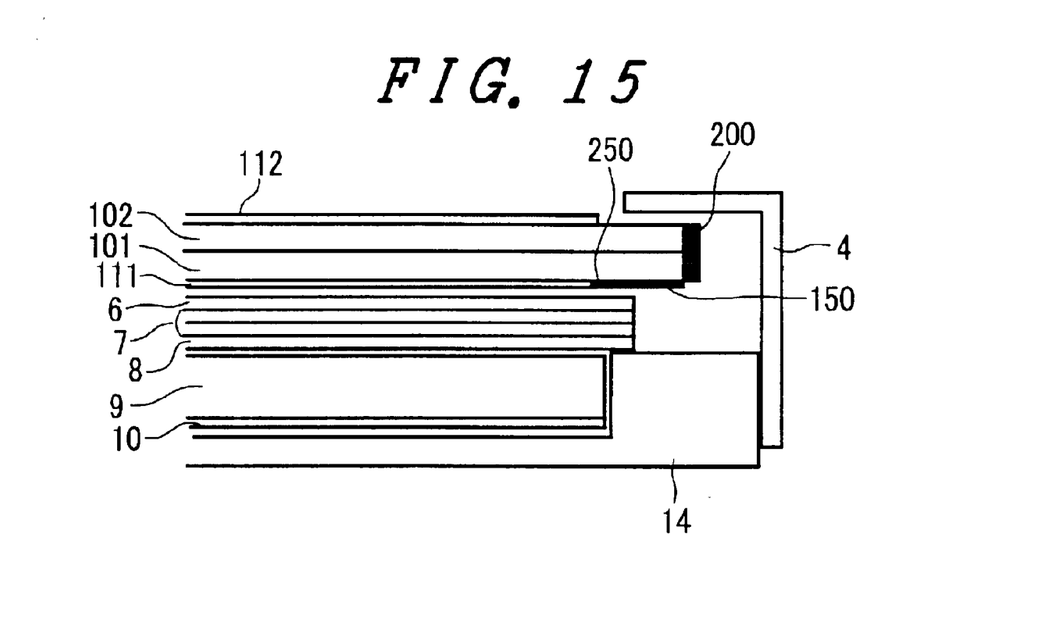
FIG. 15 is a rough cross section showing a sectional structure of a variant example of the liquid crystal display module of the embodiments according to the present invention.

Meanwhile, the lateral light shielding film 250 may be provided also on a side surface of the polarizer plate 111 in each of the aforementioned embodiments as FIG. 15 shows.

In the liquid crystal display panel 5 shown in FIG. 15, the light leak due to light from the backlight incident onto the side surface of the polarizer plate 111 can be prevented.

In this case, two of the side surfaces of the polarizer plate 111 at the side of the liquid crystal injection port 131 and other than than a side surface thereof continuing from the side of the glass substrate 101 where a semiconductor integrated circuit device (IC) is mounted are preferably to be covered.

Furthermore, while the embodiments applying the present invention to the TFT type liquid crystal display module are mainly explained as above, the present invention need not to be limited to such the embodiments but may be applied to the STN type liquid crystal display module as well.

While the invention by the present inventors has been explained concretely on the basis of the aforementioned embodiments as above, however the present invention should not be interpreted to be limited to the embodiments and can be modified in several manners within the gist thereof as well.

The advantages obtained by the representative ones of the inventions disclosed in the present specification will be explained briefly as follows.

(1) The liquid crystal display device according to the present invention can prevent the light leak of the backlight incident upon the side surfaces of the liquid crystal display device and leaking out between the frame and the polarizer plate.

Therefore, image quality of the display screen displayed by the liquid crystal display panel can be improved.

(2) In the liquid crystal display device according to the present invention, since the lateral light shielding film is formed of the polyester resin containing black pigment added thereto, the lateral light shielding film is neither crumbled to be powdered nor peeled partially so that any foreign substances are prevented to enter the liquid crystal display module.

Moreover, the light shielding film is formed continuously like a tape, and can be peeled off continuously during exfoliation thereof.

What is claimed is:

1. A liquid crystal display device comprising:

a liquid crystal display panel including a first substrate, a second substrate, and a sealing material provided between the first and second substrates on peripheral portions of respective main surfaces thereof for sealing liquid crystal in a space therebetween, a front surface of the second substrate constituting a display surface of the panel;

a backlight unit irradiating a back surface of the first substrate with light, the back surface being opposite form the display surface across the panel, the backlight unit including a light guide body which has a main surface being opposite to the back surface of the first substrate and a cold cathode fluorescent lamp disposed opposite to a side surface of the light guide body;

a rectangular frame formed of a material obstructing light, having a display window exposing the display surface of the liquid crystal display panel, and covering a peripheral portion of the liquid crystal display panel around the display surface; and a molded frame having side walls in which the light guide body is inserted and holding the liquid crystal display panel in conjunction with the rectangular frame, wherein both of the first substrate and the second substrate are formed of an insulating material having sufficient optical transmissivity to make the substrates transparent, the peripheral portion of the main surface of the first substrate extends outwards from that of the second substrate at a first side and a second side transverse to the first side thereof and overlaps that of the second substrate at a third side opposite to the first side and a fourth side transverse to the third side and opposite to the second side, each said side of the first substrate and the second substrate has a side surface transverse to the back surface of the first substrate or the front surface of the second substrate respectively, the sealing material has an injection port for injecting the liquid crystal between the first and second substrates, the injection port is formed at a third side of the liquid crystal display panel, the injection port is plugged by a closing material, the third and fourth side surfaces of the first and second substrates are covered with a light shielding film and disposed above the side wall of the molded frame to be enclosed by the rectangular frame, and the light shielding film extends from the third and fourth side surfaces of the first substrate to the third and fourth side surfaces of the second substrate and covers the closing material at the third side thereof.

2. A liquid crystal display device according to claim 1, wherein the light sealing film is a black-colored tape adhered to the side surfaces by an adhesive.

3. A liquid crystal display device according to claim 1, wherein the light sealing film is formed of polyester resin to which black pigment is added, and is formed on the side surfaces without an adhesive.

4. A liquid crystal display device according to claim 3, wherein the polyester resin contains a copolymer of ethylene terephthalate and modified alkylene ether terephthalate.

5. A liquid crystal display device according to claim 3, wherein the black pigment contains at least one of carbon black and metal black pigment.

6. A liquid crystal display device according to claim 3, wherein the light shielding film has a thickness ranged between 40 µm and 120 µm.

7. A liquid crystal display device according to claim 1, wherein the light shielding film is further provided on a side surface of the sealing material.

8. A liquid crystal display device according to claim 7, wherein the light shielding film is further provided to cover at least one of a portion of the back surface of the first substrate and a portion of the front surface of the second substrate.

9. A liquid crystal display device according to claim 1, wherein the first and second side surfaces of the first substrate and the second substrate is not covered by the light shielding film.

10. A liquid crystal display device according to claim 9, wherein semiconductor integrated circuits are provided on the peripheral portion of the main surface of the first substrate extending outwards from that of the second substrate at the first side and the second side thereof.

11. A liquid crystal display device according to claim 10, wherein another light shielding film covers the peripheral portion of the opposite surface of the first substrate which opposite to the peripheral portion of the main surface thereof and extending outwards from that of the second substrate.

12. A liquid crystal display device according to claim 1, wherein the liquid crystal display panel has a black matrix formed therein to extend from where the sealing material is formed therebelow to a space in which the liquid crystal is sealed therebwlow, the black matrix partially overlaps with the sealing material therebelow and is absent from an area where the injection port is formed therebelow.

13. A liquid crystal display device according to claim 12, wherein the black matrix is a film made of an organic material.

* * * * *